United States Patent
DeLuca (10) Patent No.: US 10,206,444 B1
(45) Date of Patent: Feb. 19, 2019

(54) FASTENER FOR GARMENT DRAWSTRINGS, LACES, AND THE LIKE

(71) Applicant: Charles DeLuca, Merrick, NY (US)

(72) Inventor: Charles DeLuca, Merrick, NY (US)

( * ) Notice: Subject to any disclaimer, the term of this patent is extended or adjusted under 35 U.S.C. 154(b) by 0 days.

(21) Appl. No.: 15/639,246

(22) Filed: Jun. 30, 2017

Related U.S. Application Data (63) Continuation-in-part of application No. 15/141,219, filed on Apr. 28, 2016, now Pat. No. 9,894,948, which is a continuation-in-part of application No. 14/339,311, filed on Jul. 23, 2014, now Pat. No. 9,347,522.

(51) Int. Cl.
*A43C 7/00* (2006.01)
*A41F 9/02* (2006.01)

(52) U.S. Cl.
CPC ............... *A41F 9/025* (2013.01); *A43C 7/00* (2013.01)

(58) Field of Classification Search
CPC .................................. A41F 9/025; A43C 7/00
See application file for complete search history.

(56) References Cited

U.S. PATENT DOCUMENTS 3,540,637 A * 11/1970 Ezell ...................... A01K 65/00
224/103

* cited by examiner

*Primary Examiner* — Robert Sandy
*Assistant Examiner* — Michael S Lee
(74) *Attorney, Agent, or Firm* — Alfred M. Walker; Allen R. Morgastern

(57) ABSTRACT

A fastener with one or more movable locking continuous or discontinuous (c-shaped) bands in a drawstring of sweatpants. The body of the fastener is made out of a material, such as highly dense polyurethane foam, that is strong, yet flexible, or of a rigid plastic, that is strong, yet flexible. The drawstring to be fastened passes through one or more gripping and/or locking holes in the fastener body. When the shoelace is passed through the gripping and/or locking holes, the dense polyurethane foam grips the lace tightly. The free ends are pulled through one or more peripheral slits extending towards, but not all the way to, the gripping and/or locking holes and then bent against the upper outer surface of the disk and locked in place in the respective one or more peripheral locking slits. Flexible and/or rigid bands encircling over the fastener drawstrings further secure the drawstrings in a locked position.

12 Claims, 10 Drawing Sheets

FASTENER FOR GARMENT DRAWSTRINGS, LACES, AND THE LIKE

RELATED APPLICATIONS

This application is a continuation-in-part of application Ser. No. 15/141,219, filed Apr. 28, 2016, which '219 application is a continuation-in-part of application Ser. No. 14/339,311, filed Jul. 23, 2014, now U.S. Pat. No. 9,347,522 B2, and claims priority in part under 35 U.S.C. § 120 therefrom. The '219 and '311 applications are incorporated by reference herein.

FIELD OF THE INVENTION

The present invention relates to fasteners for garment drawstrings, laces, and other flexible string cable fasteners.

BACKGROUND OF THE INVENTION

Several types of garments such as sweatpants and pajama bottoms use drawstrings to secure the garment to the wearer. Aprons frequently use fabric ties (apron strings). Shoes and sneakers commonly use laces. In all such cases, knots and/or bows are commonly used to secure the free ends of the tying members.

The prior art of Cox (USPTO published application US 2012/0284976) pertains to a shoe lace apparatus and locking mechanism. A rigid disk with a central hole and locking slit directly connecting the hole to the periphery of the disk is used to secure or lock the shoe laces within the hole of the disk. The laces are pinched by the disk at one point and the friction is used for the locking action.

Cox teaches that the lace is inserted all the way through the slit until the slit is tightened by the hole or gripping and/or locking holes in the center or central area of the disk. However, Cox does not teach the use of partially extending slits separated from the central hole. Cox is concerned with using the slit to gain access to the central hole or holes, not to provide a surface area against which to bend the draw string or lace while the draw string or lace is bent over the surface between the central hole and the partially extending slit.

Thus, Cox teaches full access must be provided through the slit to access the central hole or holes, within which the drawstring or lace is tightened.

To that end, Cox does not provide for tightening the draw string or lace through one or more central holes, then bending a draw string or lace over a surface of the disk separating the inner end of a slit and the central hole or holes, and then again bending each draw string or lace again through the slit for further retightening in place in the disk.

OBJECTS OF THE INVENTION

It is therefore an object of the present invention to provide a fastener for garment draw strings or shoe laces which tightens the draw string or shoe lace against a portion of a disk or other flat geometric fastener and then again through a slit or slits spaced apart from and terminating without communication with either of the central gripping and/or locking hole or holes.

It is also an object of the present invention to provide a draw string or shoe lace fastener which is easily used but which provides a tight fit for the draw string or shoe lace, without the need to tighten the draw string or shoe lace with a time consuming knot, which may untie by continued use.

It is also an object of the present invention to provide one or more continuous or discontinuous bands slidably movable over a drawstring to enhance locking resistance against the drawstring.

It is also an object of the present invention to vary the firmness or softness of the drawstring fastener, to insure tightening therethrough.

Other objects will become apparent from the following description of the present invention.

SUMMARY OF THE INVENTION

In keeping with these objects and others which may become apparent, the present invention is a lace and string fastener, which is used to fasten together the two strings contained in a pair of sweatpants in such a way so that the wearer's sweatpants won't fall down. The fastener can be easily tightened and loosened without the worry and inconvenience of knot formation. The fastener can be used in a variety of other ways. For example, it can also be used in joining together the two laces in a pair of sneakers.

The present invention uses a disk, such as a geometrically shaped body or buckle with one or more centrally located gripping and/or locking holes and one or more locking slits on the periphery of the disk to secure drawstrings, laces, apron strings or similar items in lieu of tying with knot and/or bow. In this manner the worry and inconvenience of knot formation is avoided while providing a fastener that can be tightened and loosened easily. It is important that the peripheral locking slits are separated from the central gripping and/or locking hole or holes to support the method of secure locking involving bending the drawstring taut over the front surface and providing more than one point of squeezing the drawstring.

One or more continuous or discontinuous (i.e. C-shaped) accessory bands may be provided over the fastener, to extend locking pressure against the drawstring, increasing locking resistance against the drawstring. In the discontinuous C-shaped band, the open space, which is located between the two respective distal ends of the C-shaped band, makes for smoother movement of the drawstring itself.

In the preferred embodiment, the body of the fastener is a thick disk of dense, flexible, yet strong material such as dense polyurethane foam. This material also has a high coefficient of friction which engages laces or drawstrings well. Other synthetic or man-made materials that are flexible and/or rigid may be used in making the body of the fastener. For high end decorative keepsake memorabilia items, the fastener can alternatively be made of metal or precious metal.

In an alternate embodiment, the body of the fastener has a two-ply construction, with a firmer upper panel bonded to a softer lower panel, to enhance the gripping of the drawstring against the softer lower panel of the two-ply body of the fastener.

Optionally, also, one or more surfaces of the body of the fastener can be texturized with bumps, recesses or other textured surface elements to enhance gripping.

One or more small separate gripping and/or locking holes are in the central area of the disk. They are significantly smaller than the relaxed crossectional diameter of the drawstring. The free ends of the drawstring are passed through each hole respectively by stretching the disk holes locally thereby grasping the drawstring securely. The disk is then adjusted as desired to secure the garment, then each end of the drawstring is bent taut over the front surface of the disk and pulled into a locking peripheral slit. When using a material such as dense polyurethane foam, the locking slits can be formed as simple slits since the flexibility of the material will yield locally to permit entry of a drawstring end thereby locking it securely. The slits are sufficiently narrow with sidewalls of the slits having a sufficiently high coefficient of friction to prevent loosening of the drawstring while in service of being worn or otherwise used. Thus, in the preferred embodiment, each drawstring end is first grasped by the central hole which still permits adjustment, then a second point of frictional locking in series with the first is provided by sliding the free end in the peripheral slit. This provides a locking fastener with great pull-out resistance by virtue of the high coefficient of friction, the grasping of the drawstring by the central hole, and the locking in the slit whereby each free end also undergoes two right angle bends. This is because in this embodiment, the gripping and/or locking holes in the fastener are more like potential holes and slits, because after the gripping and/or locking hole or slit is made, the dense polyurethane foam all but closes up again. When the shoelace is passed through the gripping and/or locking holes and slits, the dense polyurethane foam grips the lace tightly.

The method of use the preferred first embodiment of fastening a drawstring extending from a garment without use of a knot, using one or more central gripping and/or locking holes includes the following steps of:

a) using a first aglet on an end of a first end portion of the drawstring to push the first end portion through at least one first central gripping and/or locking hole in a disk;

b) using a second aglet on an end of a second end portion of the drawstring to push the second end portion optionally through the first central gripping and/or locking hole or through a second central gripping and/or locking hole in the disk, the central holes being spaced from each other, c) folding and pulling taut said first end portion through at least one first peripheral locking slit extending inwardly from an outer periphery of the disk; and, d) folding and pulling taut the second end portion optionally through the first peripheral locking slit or through a second peripheral locking slit extending inwardly from the outer periphery of the disk; and, e) the slits being sufficiently narrow with sidewalls of the slits having a sufficiently high coefficient of friction to prevent loosening of the drawstring while in service of being worn or otherwise used.

In the first embodiment, the disk can have a variety of peripheral shapes. Also, the thickness of the disk material can be uniform, or it can vary with a variation from the center to the edges so that side profiles such as hemispheres, cubes or spheres are also possible. Extra peripheral slits afford more convenience and more locking power when needed, as well.

In a second embodiment, a rigid plastic disk with a single central hole is used with two parallel locking slits (one longer than the other) on each side of the hole. The plastic disk material may be selected from a wide variety of resins such as rigid polyvinyl chloride (PVC), Nylon, polypropylene, or a rigid closed-cell foamed PVC such as, for example, SINTRA® of 3A Composites USA, Inc., Statesville, N.C. In this embodiment, wrapping of the drawstring free ends completely around the median disk material between the two slits on each side of the hole produces great pull-out resistance even using a thinner disk with lower friction between drawstrings and disk material. For high end decorative keepsake memorabilia items, the fastener can alternatively be made of metal or precious metal.

The method of use of the second embodiment of fastening a drawstring extending from a garment without use of a knot using the preferred embodiment with a single central hole includes the following steps of:

a) using a first aglet on an end of a first end portion of the drawstring to push the first end portion through at least one central gripping and/or locking hole in a disk;

b) using a second aglet on an end of a second end portion of the drawstring to push the second end portion through the at least one central gripping and/or locking hole or a second central gripping and/or locking hole, c) folding and pulling taut the first end portion through a first peripheral locking slit extending inwardly from an outer periphery of the disk;

d) folding and pulling taut the second end portion through a second peripheral locking slit extending inwardly from the outer periphery of the disk;

e) folding and pulling taut the first end portion through a third peripheral locking slit extending inwardly from the outer periphery of the disk; and f) folding and pulling taut the second end portion through a fourth peripheral locking slit extending inwardly from the outer periphery of the disk;

g) the slits being sized to squeeze the end portions and provide some pull-out resistance with only a moderate amount of friction.

Therefore, in general, the fastener for drawstrings, laces and the like includes a disk with one or more gripping and/or locking holes in a central region and one or more peripheral locking slits spaced apart from and terminating without communication with either of the one or more gripping and/or locking holes. The fastener fastens drawstrings for clothing, such as sweat pants, as well as laces, such as shoe or sneaker laces, each having two free ends, wherein the free ends are passed through the one or more gripping and/or locking holes in central region of the fastener. The free ends are pulled through the one or more gripping and/or locking holes and then bent against the upper outer surface of the disk and locked in place in the respective one or more peripheral locking slits.

BRIEF DESCRIPTION OF THE DRAWINGS

The present invention can best be understood in connection with the accompanying drawings. It is noted that the invention is not limited to the precise embodiments shown in drawings, in which:

FIG. 22 also a firmer alternate embodiment with a texturized surface, such as with bumps or other texturized shapes, to enhance gripping of the drawstring by and through the two-ply fastener block.

DETAILED DESCRIPTION OF THE INVENTION

In this invention, the operational description focuses on the term drawstring. It is noted herein that the terms lace or fabric tie, or even string, can be used interchangeably, as the fastener can be used as well for a variety of garments or other uses such as duffle bags, beach bags, laundry bags, or decorative bands each with their favorite name for a fabric tie. Additionally, a decorative shoe lace can be used as a belt for pants with belt loops holding the drawstring as a belt-type fastener. It is also known that the fastener can be adorned with logos or other decorative indicia, such as a cubic shaped fastener bearing the markings of a gaming dice piece. Sports or entertainment logos and characters can also adorn the fastener.

Figure 1:
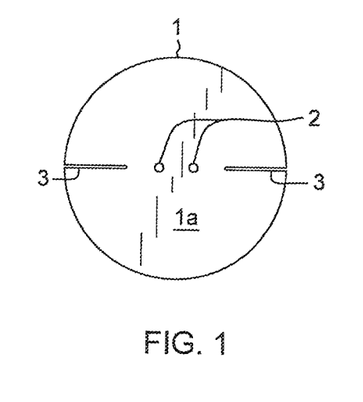
FIG. 1 is a plan view of the fastener of the preferred embodiment of this invention.
Figure 2:
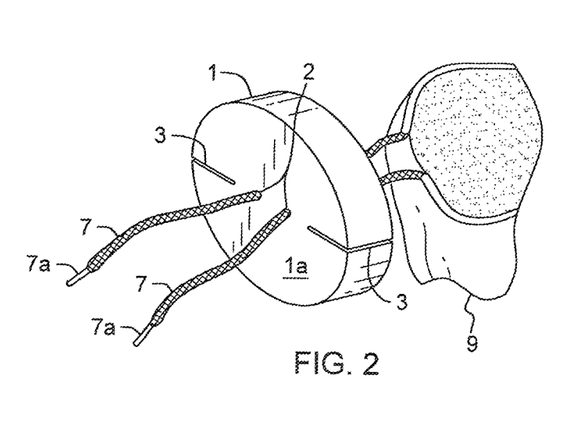
FIG. 2 is a perspective view of the preferred embodiment with drawstring ends engaged through the two central gripping and/or locking holes permitting adjustment.
Figure 3:
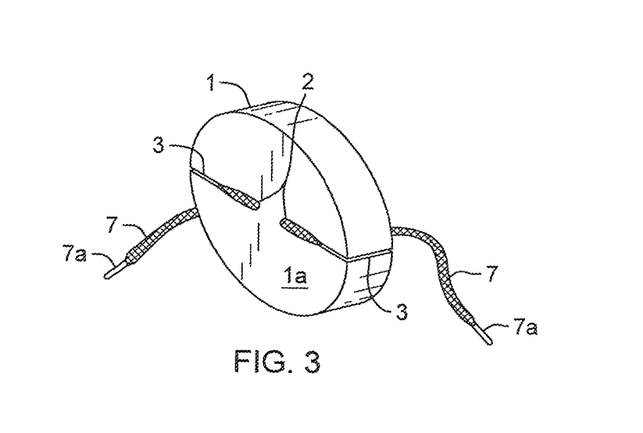
FIG. 3 is a perspective view of the preferred embodiment in a locked configuration with drawstring ends locked in peripheral slits.
Figure 4A:
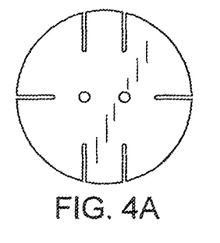
FIGS. 4A to 4F are plan views of outer contours of the disks that can be used with this invention; wherein a round shape is shown at "4A", an oval shape is shown at "4B", a rectangular shape is shown at "4C", a hexagonal shape is shown at "4D", an octagonal shape is shown at "4E" and a circular shape with two opposite pairs of slits is shown in 4F.
Figure 4B:
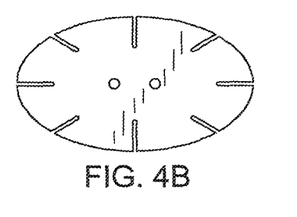
Figure 4C:
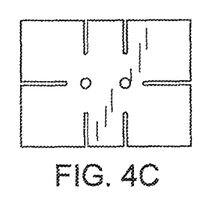
Figure 4D:
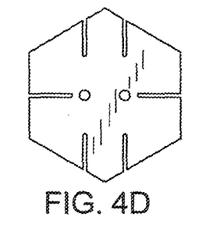
Figure 4E:
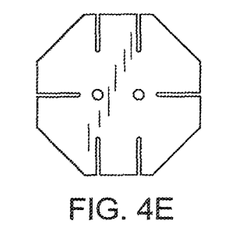
Figure 4F:
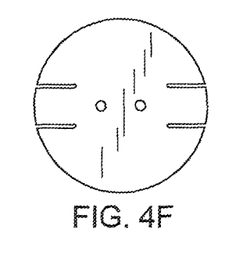

The one embodiment of fastener of this invention is illustrated in FIGS. 1-3.

In FIG. 1, a thick semi-rigid disk 1, such as, for example, a dense polyurethane foam disk 1, has a plurality of centrally located gripping and/or locking holes, such as, for example, two centrally located gripping and/or locking holes 2 and two peripheral locking slits (here shown as slits) 3. Locking slits 3 are sufficiently narrow with sidewalls of slits 3 having a sufficiently high coefficient of friction to prevent loosening of the drawstring while in service of being worn or otherwise used. While the length and width of the slits may vary, the width of the slits 3 are preferably in the range of 1/32 to 1/16 inch in width.

In FIG. 2, disk 1 is shown being threaded through by the aglets 7a of the free ends 7 of a drawstring which is engaged with a garment 9, such as a pair of sweatpants. In this configuration, adjustment of disk 1 relative to string ends 7 is possible even though gripping and/or locking holes 2 grasp string ends 7 aggressively due to the small diameter of gripping and/or locking holes 2 relative to string diameter and the high coefficient of friction and elastomeric nature of disk 1 material. Once adjusted as desired, each free end 7 is bent 90 degrees along the front surface 1a of disk 1 and then engaged in adjacent slit 3 for locking with high pull-out resistance (as shown in FIG. 3). End aglets 7a of the free ends 7 of the draw strings provide a grasping space for the fingers of the wearer of the garment.

Figure 5A:
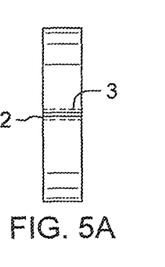
FIGS. 5A to 5D are side views of four different disk implementations; a thick disk of uniform thickness is shown at "5A", a hemispherical side contour is shown at "5B", a spherical side contour is shown at "5C" and a cubic side contour is shown at 5D.
Figure 5B:
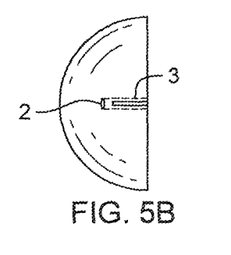
Figure 5C:
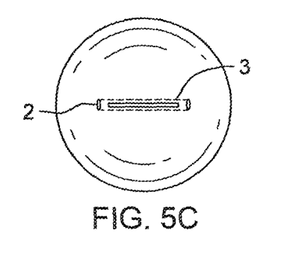
Figure 5D:
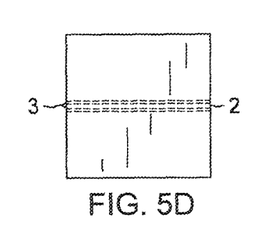

FIGS. 4A to 4F and 5A to 5D show that the outer contour of disk 1 can be almost any shape enclosing a significant flat area. Some useful shapes are shown in FIGS. 4A through 4F. It is also noted that more than two peripheral slits are shown for convenience. Any pair can be used; multiple slits on each string end 7 can also be used for even greater security although hardly needed. Similarly, the thickness of disc 1 need not be constant as shown in FIG. 5A. A hemispherical side contour such as at FIG. 5B, a fully spherical shape such at FIG. 5C or even a cubic shape such as in FIG. 5D can be utilized. The locking slits are sufficiently narrow with sidewalls of the slits having a sufficiently high coefficient of friction to prevent loosening of the drawstring while in service of being worn or otherwise used.

Figure 6:
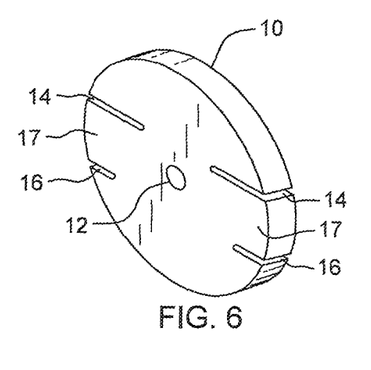
FIG. 6 is a perspective view of the disk fastener of the second embodiment.
Figure 7A:
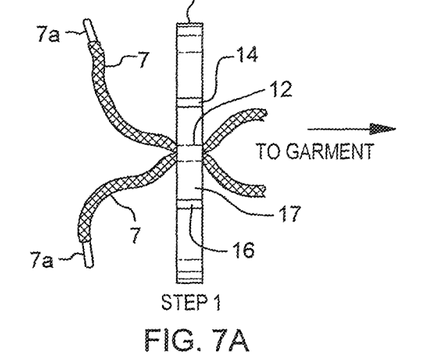
FIGS. 7A and 7B are side views of two steps of using the fastener of FIG. 6; wherein step 1 of FIG. 7A involves pulling both drawstring free ends through the central hole providing the adjustment configuration, while step 2 of FIG. 7B shows the locking method of inserting a free end in a long slit at "A", bending over the back surface and engaging a short slit at "B" and then bending over front surface again and reinserting in the long slit at "C".
Figure 7B:
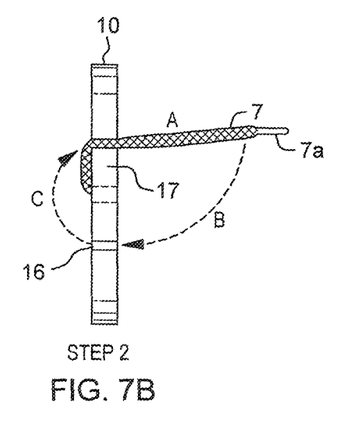
Figure 8:
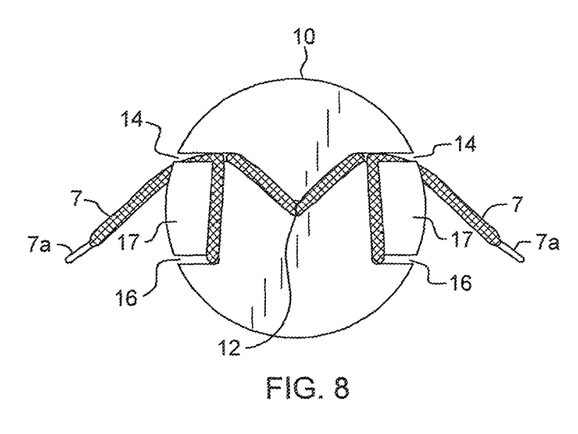
FIG. 8 is a plan view of the fastener of the second embodiment in a locked configuration.

FIGS. 6-8 illustrate an alternate embodiment of this invention. FIG. 6 shows disk 10 made of rigid yet flexible plastic with one central hole 12 and a pair of locking slits (long 14 and short 16) on either side of hole 12. Note the median section 17 of disk 10 between slits 14 and 16. To insure excellent pull-out resistance (once locked) with less friction between string free ends 7 and disk 10 than that of the preferred embodiment, free ends 7 are wrapped 360 degrees around median area 17 to compensate. This motion also involves four 90 degree bends of each free end 7 and four series points of squeezing of drawstring in central hole and two slits. Slits 14 and 16 are sufficiently narrow with sidewalls of the slits 14 and 16 having a sufficiently high coefficient of friction to prevent loosening of the drawstring while in service of being worn or otherwise used.

FIGS. 7A and 7B show the two steps of adjusting and locking using disk 10. Step 1 of FIG. 7A involves threading both free ends 7 through central hole 12. This squeezes both free ends 7 against the sides of hole 12 by virtue of the size of the hole and the resiliency of the drawstring material. Disk 10 can be easily adjusted since the grasping action is not too aggressive. The wrapping and locking takes place in step 2 of FIG. 7B as detailed in sub-steps A, B, and C. Peripheral slits are sized to squeeze free ends 7 and provide some pull-out resistance with only a moderate amount of friction. It is the totality of free-end 7 engagement with disk 10 that provides the aggregate amount of disk 10 to drawstring pull-out resistance. This embodiment may be preferable for use on sneakers or sport shoes since disk 10 can be thinner and smaller than disk 1. FIG. 8 shows a front view of the locked configuration.

Figure 9:
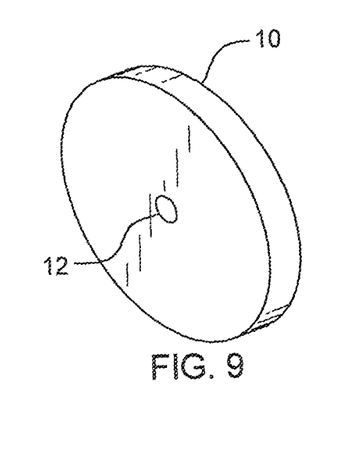
FIG. 9 is a perspective view of an embodiment of a fastener with at least one central gripping and/or locking hole and no slit.

FIG. 9 shows an embodiment of a fastener 10 with at least one central gripping and/or locking hole 12 and no slit.

Figure 10:
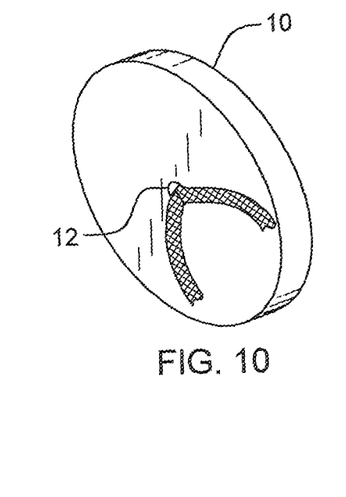
FIG. 10 is a perspective view of the fastener of FIG. 9, shown with a portion of a drawstring extending therethrough.

FIG. 10 shows the fastener 10 of FIG. 9, shown with a portion of a drawstring extending through central gripping and/or locking hole 12.

Figure 11:
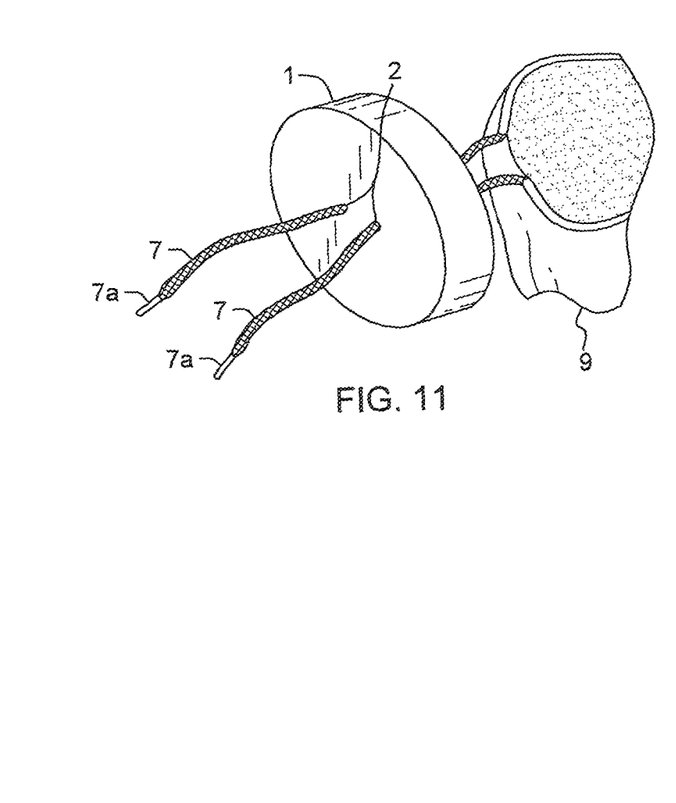
FIG. 11 is a perspective view of an embodiment of a fastener with two central gripping and/or locking holes, with no slits, showing portions of a drawstring extending therethrough.

FIG. 11 shows an embodiment of a fastener 1 with two central gripping and/or locking holes 2, with no slits, showing portions 7 of a drawstring with aglets 7a extending therethrough.

Figure 12:
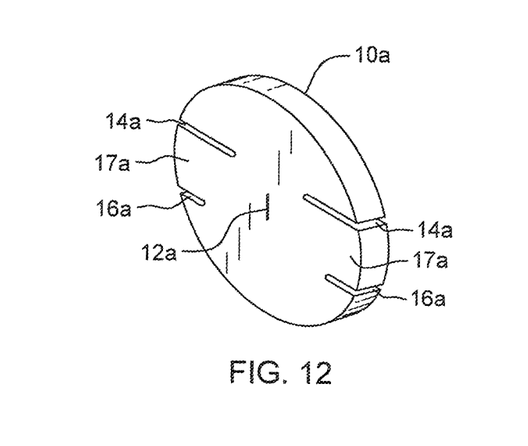
FIG. 12 is a perspective view of the disk fastener of an alternate embodiment with a normally closed central locking/gripping hole.
Figure 12A:
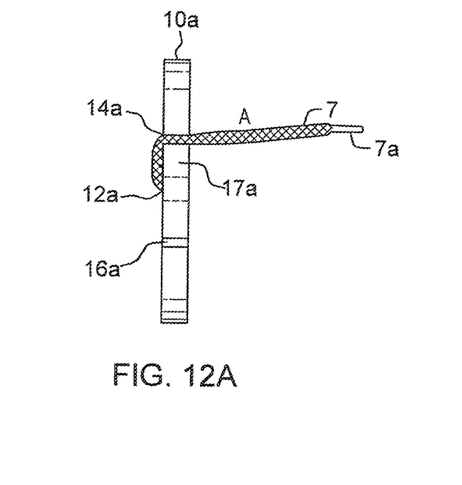
FIG. 12A is a side view of using the fastener in the disk fastener of FIG. 12

FIGS. 12 and 12A illustrate a further alternate embodiment of this invention. FIG. 12 shows disk 10a made of polyurethane foam with one normally closed central locking/gripping hole 12a in the form of an openable slit, and a pair of locking slits (long 14a and short 16a) on either side of normally closed locking/gripping hole 12a. To insure excellent pull-out resistance (once locked) with less friction between draw string free ends 7 with aglet 7a and disk 10a, free ends of draw string 7 are wrapped 360 degrees around median area 17a to compensate, and then inserted in locking slit 14a. Slits 14a and 16a are sufficiently narrow with sidewalls of the slits 14 and 16 having a sufficiently high coefficient of friction to prevent loosening of the drawstring 7 while in service of being worn or otherwise used.

FIGS. 13-18 relate to two further embodiments of this invention using a generally rectangular body and/or buckle and bands to secure the drawstrings or laces. The bands can be made of any naturally-occurring, synthetic or man-made materials that are flexible and/or rigid.

Figure 13:
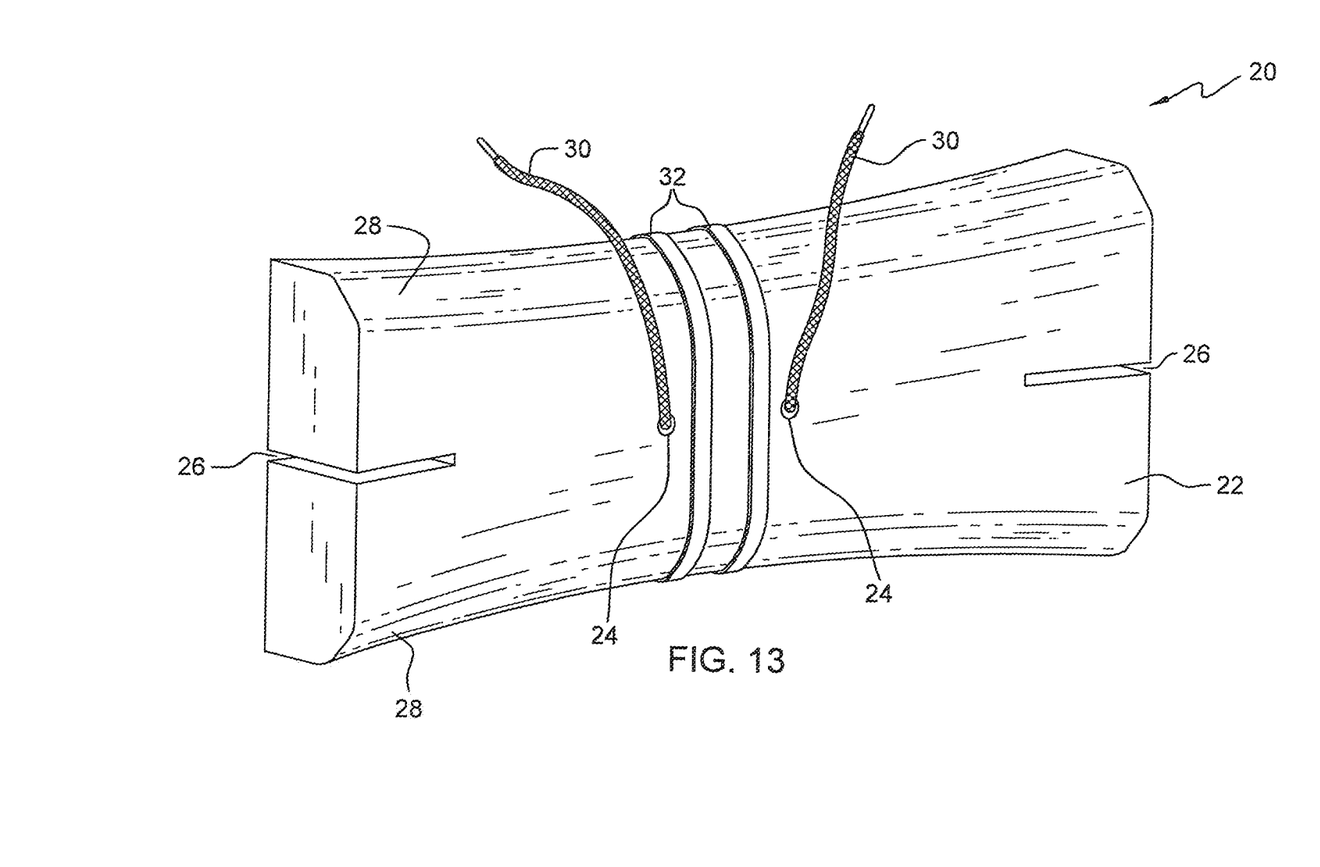
FIG. 13 is a perspective view of the unlocked state of an alternate embodiment of this invention using a generally rectangular body and/or buckle, and bands, to enhance the locking capability of the drawstrings or laces.

FIG. 13 shows the body and/or buckle of the first embodiment 20 with rigid substrate 22 having two centrally located holes 24 and two end located engagement slots 26. The top and bottom front edges are rounded 28 and two flexible and/or rigid bands 32 have been moved between holes 24 in this unlocked configuration. Laces 30 emerge from holes 24. Substrate 22 has an hourglass contour as viewed from the front with the distal ends wider than the center region.

Figure 14:
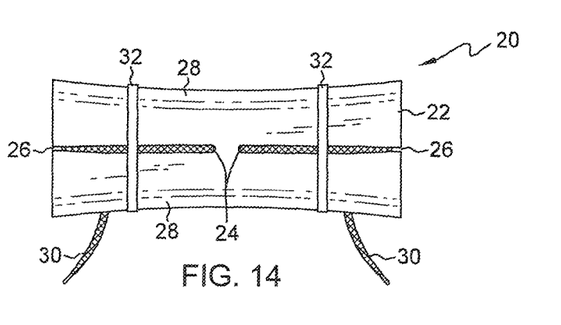
FIG. 14 is a plan view of the embodiment of FIG. 13 showing the position of the flexible and/or rigid bands and drawstrings in the locked state.

FIG. 14 shows the configuration with flexible and/or rigid bands 32 pressing down on laces 30 which are also engaged within edge slots 26; this is the locked state. Note that substrate 22 can be any rigid or semi-rigid material of sufficient strength such as plastics, hard rubber, leather, or even dense wood. Flexible and/or rigid bands 30 can be metal, rubber, polyurethane, silicone or the like.

Figure 15:
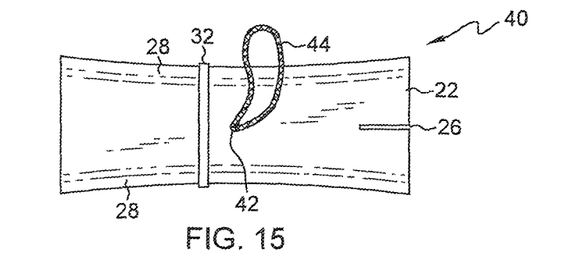
FIG. 15 is a plan view of the unlocked state of an embodiment having a body and/or buckle with a single hole and one flexible and/or rigid band for use in engaging a pants loop.
Figure 16:
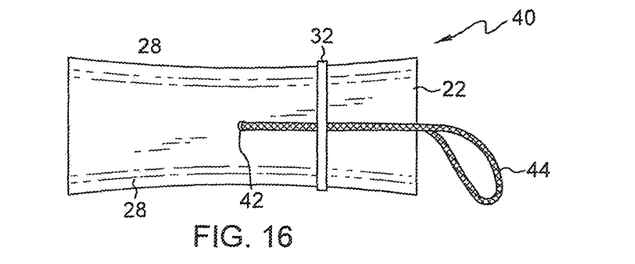
FIG. 16 is a plan view of the locked state of the embodiment of FIG. 15 showing the position of the flexible and/or rigid band and pants loop.

FIGS. 15 and 16 show front views of a variation of embodiment 20 oriented to the use of a loop drawstring 44 as for a pants loop. Embodiment 40 has a similar substrate 22 with a single central hole 42 and a single engagement slot 26 on one end only. A single elastomer band 32 is used. FIG. 15 shows the unlocked condition, while FIG. 16 shows loop 44 engaged within edge slot 26 with pressure from band 32 enhancing the locking resistance.

Figure 17:
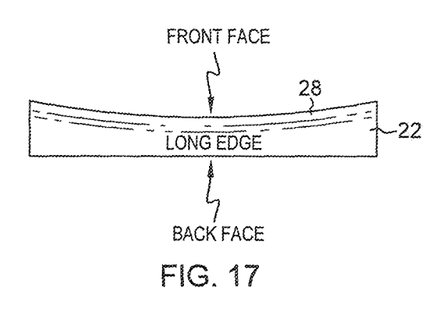
FIG. 17 is a plan view of the edge of the body and/or buckle substrate with an enhanced top surface curvature.

FIG. 17 shows a side view of substrate 22 with optional thickness contour of the front face such that substrate 22 would be thinner at the center and thicker toward both distal ends. The resulting compound curve enhances the rate of stretching of flexible and/or rigid bands 32 as they are moved sideways from the central region towards either distal end. As in FIGS. 13 and 17, from the center of the body to the outer ends, the thickness can optionally increase in certain spots, or on the entire length, in a upward and/or sidewards tapered fashion, to increase friction on the lace in the locked position; or the thickness can stay equal on the entire length of the body or buckle.

Figure 18:
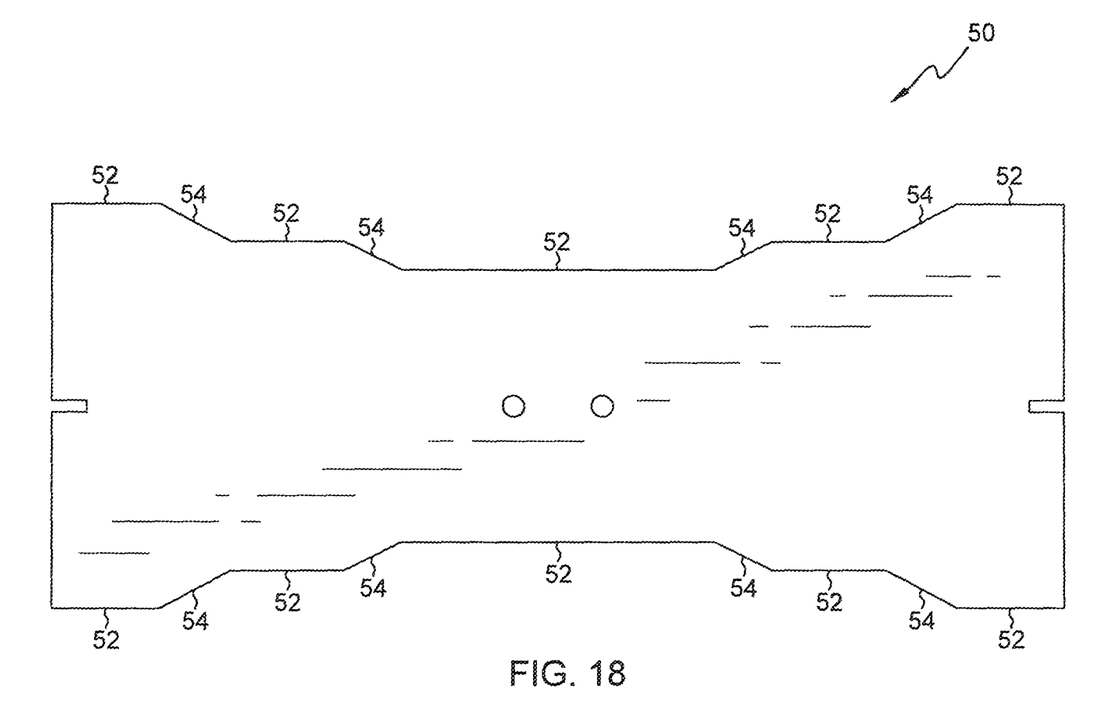
FIG. 18 is a plan view showing an alternate buckle contour with stepped width variations replacing the continuous curves.
Figure 19:
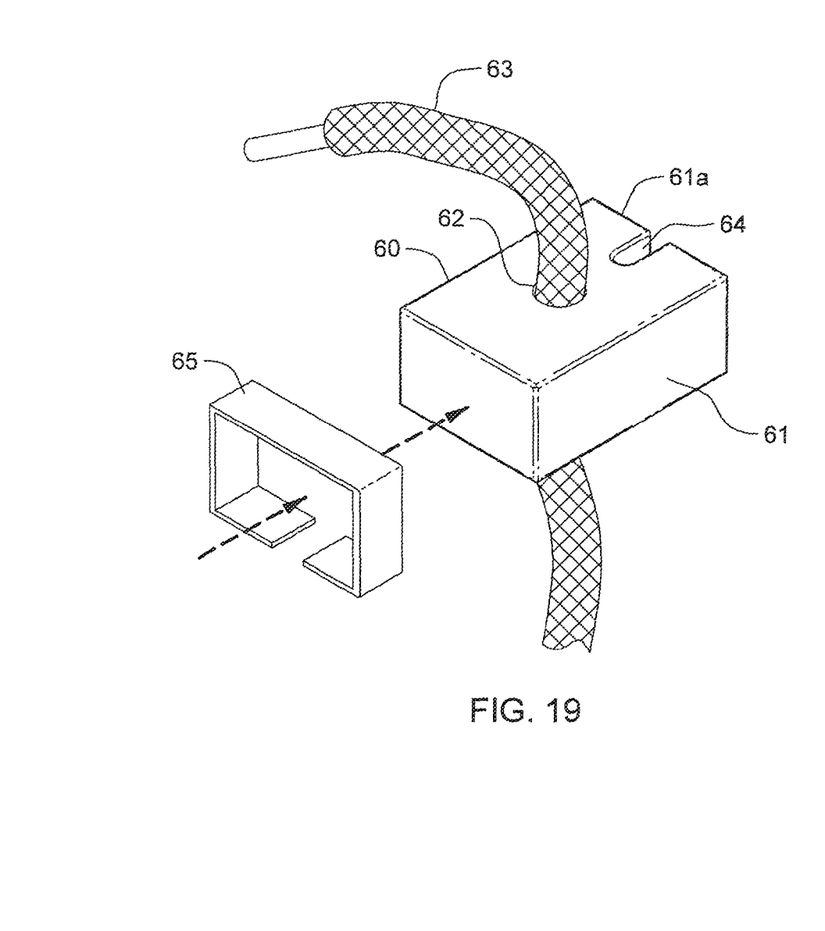
FIG. 19 is an exploded perspective view of an alternate embodiment showing a discontinuous, partially open, C-shaped band being inserted over the body of the fastener.

FIG. 18 shows an embodiment of buckle substrate with a stepped width contour as opposed to the continuous curves shown for substrate 22. Here in substrate 50, the top and bottom edges have five (five are shown) or more horizontal regions on the top and bottom edges connected by slopes 54. In this way, locking bands 32 can be stretched a repeatable amount when moved to a given pair of horizontal flat regions 52 with no contour-induced tendency to slide back toward the less stretched middle position. Sloped sections 54 ease the transition from one set of flats 52 to another by providing ramps.

FIGS. 19-22 show another alternate embodiment for a drawstring fastener 60, having a discontinuous, partially open, C-shaped band 65 being inserted in the direction of the arrows, over the body block 61 of the fastener 60. Block 61 includes one or more through holes 62 for insertion of drawstring 63 of similar lace therethrough, where the partially open holes 62 are expanded when the drawstring 63 is inserted therethrough. The drawstring is then pulled over block 61 and through slit 64 located spaced apart of the hole 62 and along an edge 61a of block 61.

Figures 20, 21:
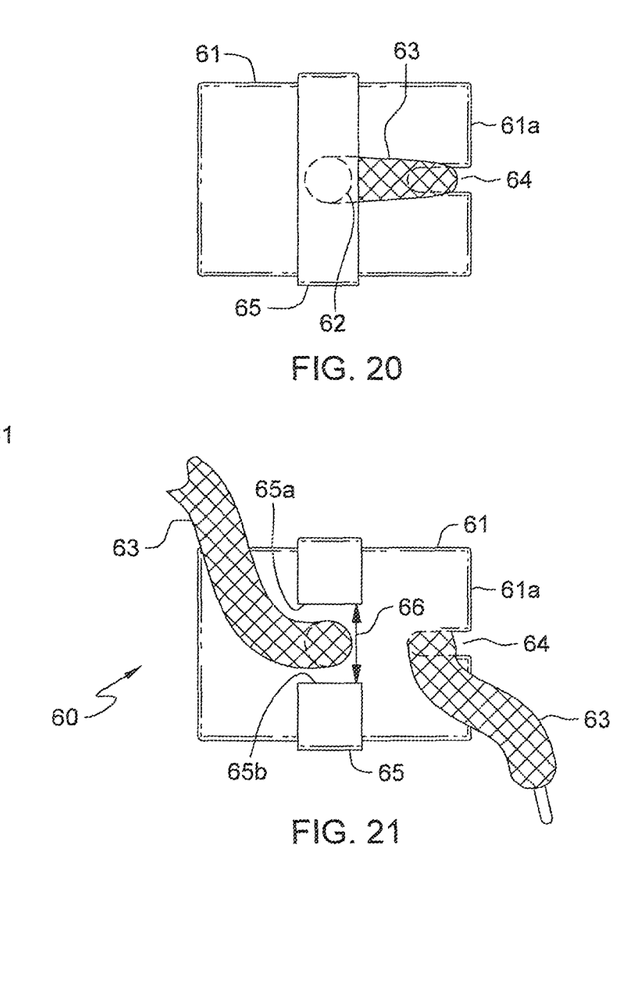
FIG. 20 is a top plan view thereof.
FIG. 21 is a bottom view thereof, showing the opening between the two distal ends of the C-shaped band providing clearance for smooth movement of the drawstring through the body of the fastener.

FIG. 21 shows a bottom view thereof, showing the opening 66 between distal ends 65a and 65b providing clearance for smooth movement of the drawstring 63 or similar lace through the body block 61 of the fastener.

Figure 22:
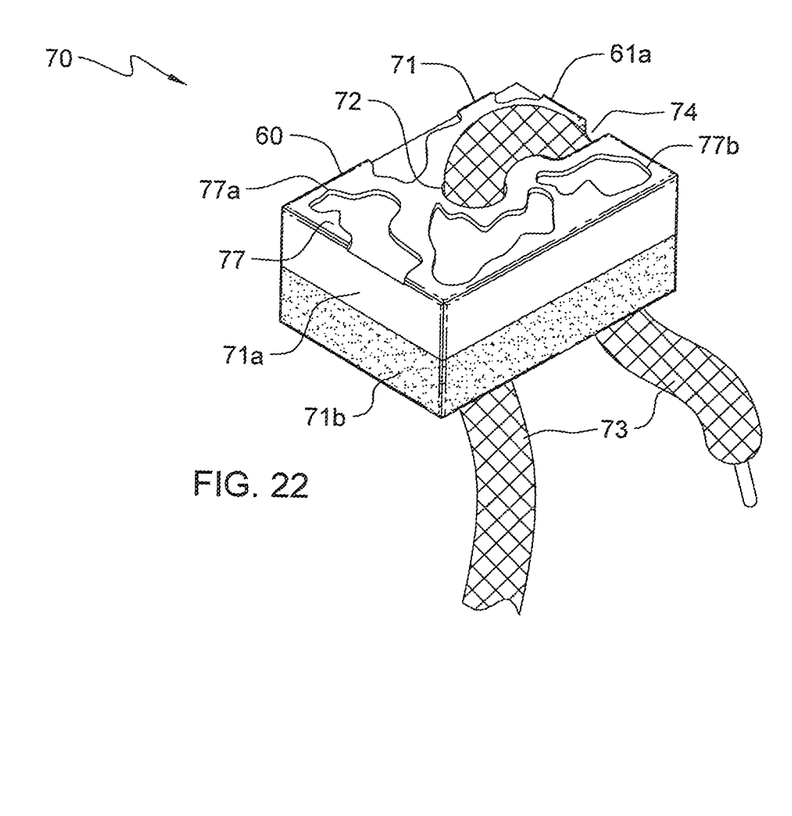
FIG. 22 is a perspective view of an alternate embodiment for a two-ply block of the fastener body with a firmer top panel and a softer lower panel to enhance gripping of the fastener drawstring against the softer bottom panel of the two-ply body.

FIG. 22 is a perspective view of an alternate embodiment for a two-ply body 71 of the fastener 70, with hole 72 and slit 74, to lock a drawstring fastener 73 in a tightened position. The two-ply body 71 includes a firmer top panel 71a and a softer lower panel 71b, to enhance gripping of the drawstring against the softer bottom panel 71b of the two-ply body 71. FIG. 22 also a further alternate embodiment for a fastener 70 with a texturized surface 77, such as with bumps 77a or other shapes 77b, such as beaded bumps, to enhance gripping of the drawstring 73 through one or more holes 71, and through at least one edge slit 74, of the two-ply body 71.

It is further noted that while FIGS. 1-3 show the fastener made of a compressible material, such as dense polyurethane foam, for example, and FIGS. 6-8 show a rigid plastic material for the fastener, it is noted that the embodiment shown in FIGS. 1-3 can alternatively be made with a rigid plastic, and the embodiment shown in FIGS. 6-8 can likewise be alternatively made with a compressible material, such as, for example, dense polyurethane foam. The same is true for the other embodiments described in FIGS. 10 through 22.

Moreover, it is also noted that while FIGS. 1-3 show pairs of slits of equal length and FIGS. 6-8 show pairs of slits of different lengths, it is noted that the slits of a compressible material of FIGS. 1-3 can alternatively be of different lengths, and that alternatively, the slits of FIGS. 6-8, made of a rigid lightweight plastic material, can alternatively be of equal lengths. The same is true for the other embodiments described in FIGS. 10 through 22. Also the user may select whatever slits he or she wants to use, if one or more of the slits gets worn from repeated washing.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A fastener for and in combination with a drawstring or lace, comprising:
    a body and/or buckle with at least one gripping and/or locking hole in a central region, said at least one gripping and/or locking hole having a sufficiently narrow diameter and having a sufficiently high coefficient of friction to prevent loosening of the drawstring or lace inserted therethrough;
    at least one peripheral locking slit penetrating said disc completely and having spaced sidewalls parallel to each other over a full length thereof extending inward from an outer periphery of said body and/or buckle;
    said at least one peripheral locking slit spaced apart from and terminating without communication with said at least one hole in said central region, said at least one peripheral slit being sufficiently narrow with sidewalls of said at least one peripheral locking slit having a sufficiently high coefficient of friction to prevent loosening of the drawstring or lace while in service;
    said drawstring or lace passing through once said at least one gripping and/or locking hole in said central region; and,
    said drawstring or lace making a right angle bend after exiting said gripping and/or locking hole and bent over and only against a surface of said disk and the drawstring or lace is locked in said at least one peripheral locking slit;
    opening sizes of said gripping hole and said at least one peripheral slit of said sidewalls engaging said drawstring or lace and said coefficient of friction being such as to secure said drawstring or lace against loosening in service along with said right angle bends, and without use of any knot in said drawstring or lace, to tie said drawstring or lace; and
    at least one C-shaped band encircling said body and/or buckle, said band being movable over the drawstring or lace, exerting pressure thereon and enhancing locking resistance against the drawstring or lace.

2. The fastener as in claim 1 wherein said body and/or buckle is a two-ply block with a firmer upper panel and a softer lower panel.

3. The fastener as in claim 1 wherein said body and/or buckle has at least one texturized surface on the fastener.

4. The fastener as in as in claim 3, wherein said body and/or buckle has a plurality of texturized surfaces.

5. The fastener as in claim 1 wherein said at least one band made of a naturally occurring material.

6. The fastener as in claim 1 wherein said at least one band is made of a synthetic material.

7. The fastener as in claim 5 wherein said synthetic material is plastic.

8. The fastener system as in claim 1 in which said body and/or buckle is made from a material having sufficient flexibility and said slit is sufficiently narrow in width to allow said material to yield locally to permit entry of said drawstring.

9. The fastener as in claim 1 in which said at least one central gripping and/or locking hole is partially open and yields to opening by insertion of aglets on ends of said end portions of said drawstring.

10. The fastener as in claim 1 wherein said body and/or buckle has a rectangular profile when viewed from above.

11. The fastener as in claim 1 wherein at least one upwardly extending bead bump is provided to provide resistance to movement of said at least one band, as said band is moved outwardly from a central region, over said drawstring to at least one distal end of said body and/or buckle.

12. The fastener as in claim 1 wherein said body and/or buckle is rectangular and flat in side.

\* \* \* \* \*